United States Patent

[15] 3,690,220

Escobedo

[45] Sept. 12, 1972

[54] HELICALLY-TRACKING MILLING ASSEMBLY WITH TILTABLE THREAD CUTTING HEAD

[72] Inventor: Francisco Escobedo, Inglewood, Calif. 90303
[73] Assignee: Fresco Industries, Inc., Gardena, Calif.
[22] Filed: April 29, 1970
[21] Appl. No.: 32,805

Related U.S. Application Data

[63] Continuation-in-part of Ser. No. 731,494, May 23, 1968, Pat. No. 3,526,167.

[52] U.S. Cl. .................. 90/17, 90/11.58, 90/11.66, 74/380
[51] Int. Cl. ............................................ B23g 1/32
[58] Field of Search ......... 90/11.58, 11.4, 11.66, 17; 10/105

[56] References Cited

UNITED STATES PATENTS 2,451,497 10/1948 Kratchman ............... 90/11.58
2,307,222 1/1943 Johnson ........................ 90/17

*Primary Examiner*—Gil Weidenfeld
*Attorney*—Howard L. Johnson

[57] ABSTRACT

An assembly for positioning and operating a milling tool or thread-forming rotary cutter, either within or external to a workpiece such as a cylinder or tube, which positioning is of especial value when the workpiece itself is inconvenient to move or rotate due to size or shape. The cutting head can follow a helical path of selected pitch provided by interchangeable pairs of threadedly engaged guide cylinders carried by telescopic members, so as to transfer such thread pattern to the workpiece. By transversely extensible gear means (such as splined shaft-bevel gear units or split gear trains) a transverse carriage which carries the cutting-positioning head can adjust the latter to different internal or external radii of the workpiece. In addition, by adjustable tilting of the positioning head, it can carry a rotary cutter of smaller diameter and hence greater cutting force; such head can be set at any angle within 360° rotation from the axis of the transverse carriage. Thus the rotary cutter can be set to the same inclination as the track of the thread being cut. The direction of rotary drive can be completely reversed, i.e., 180°. As one power source, the positioning assembly can be attached to a milling machine, or it can be operated independently thereof.

8 Claims, 51 Drawing Figures

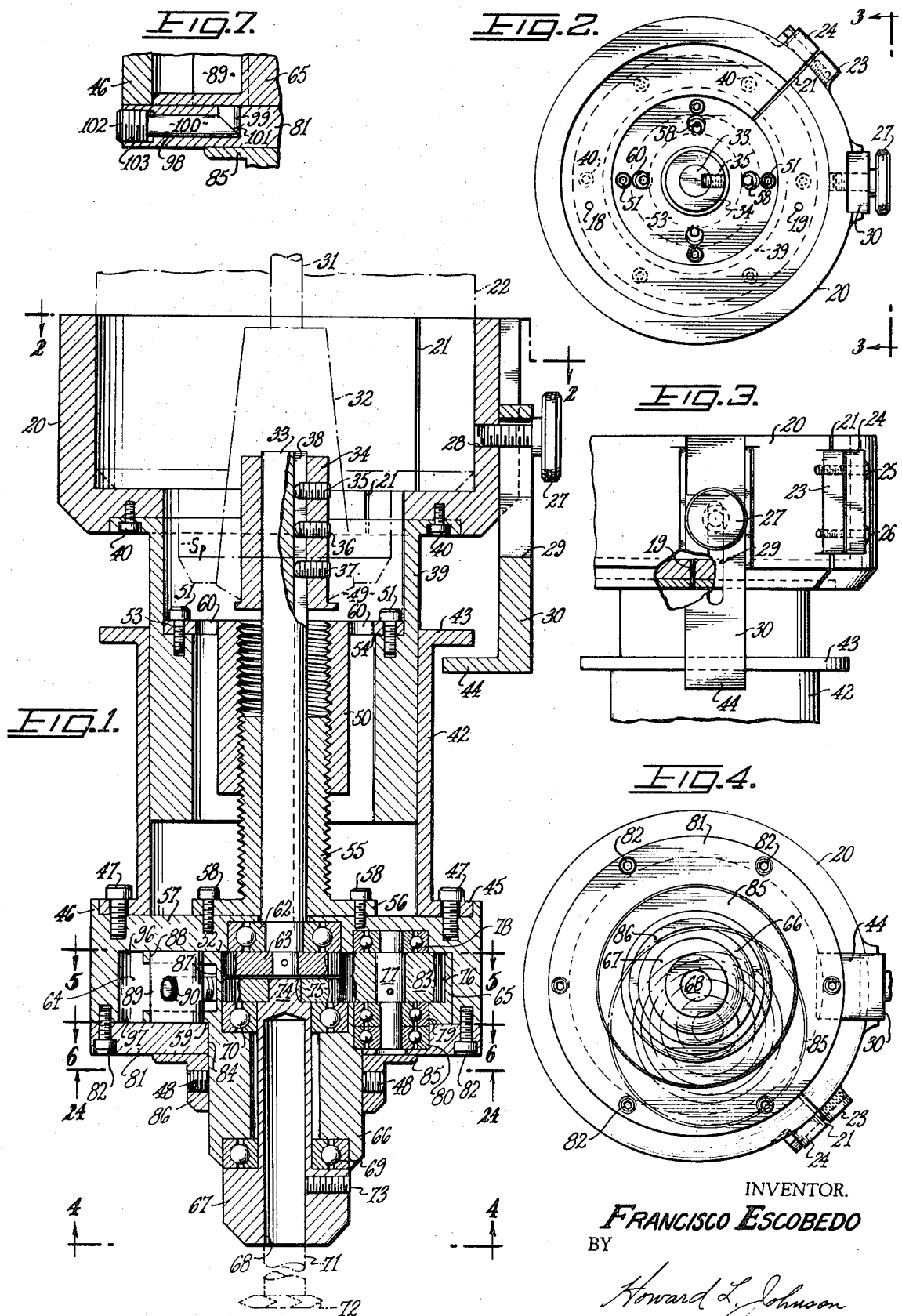

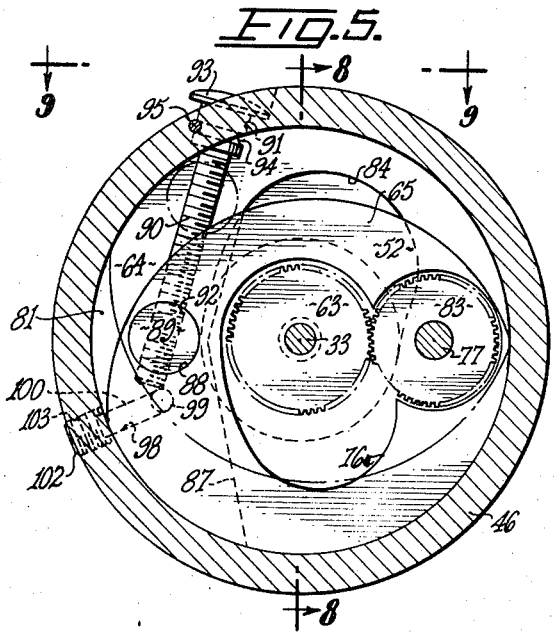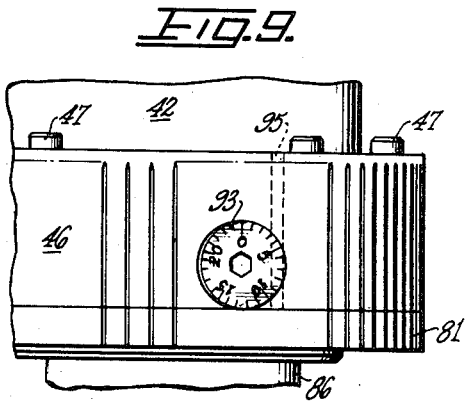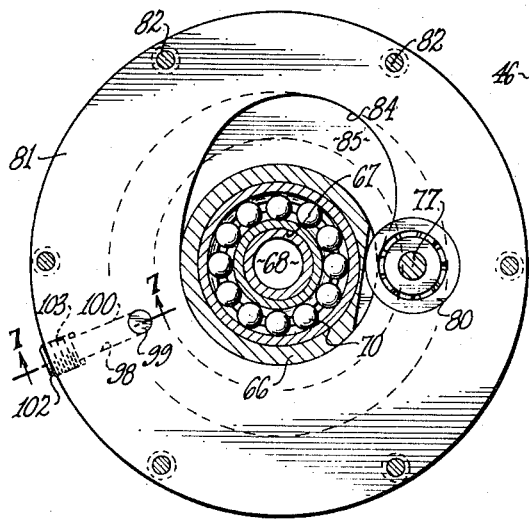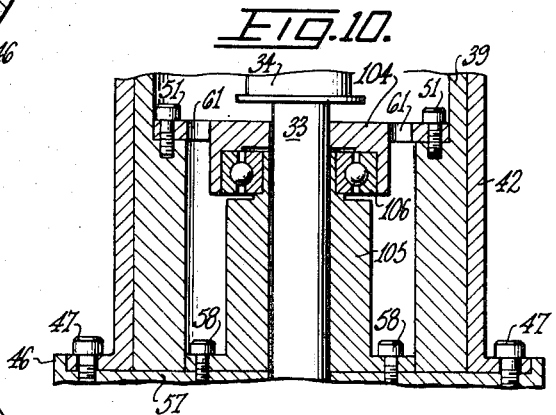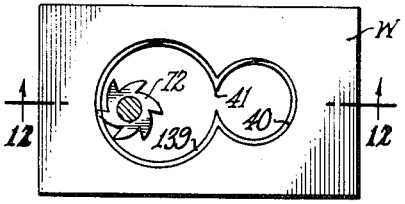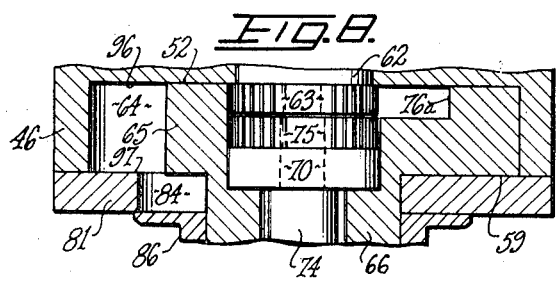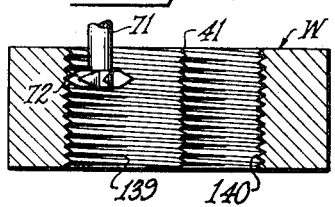

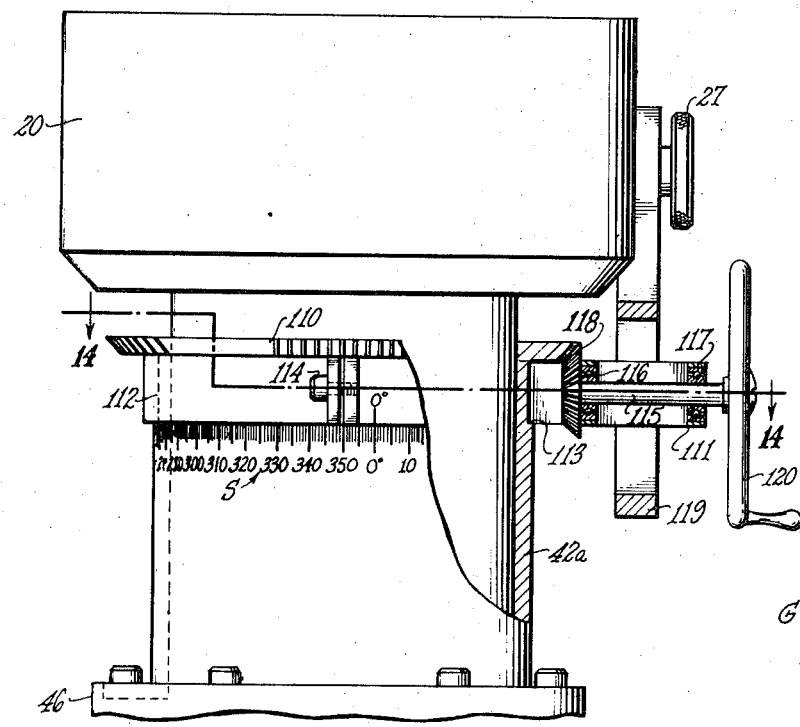
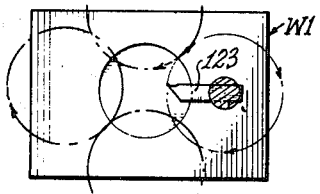
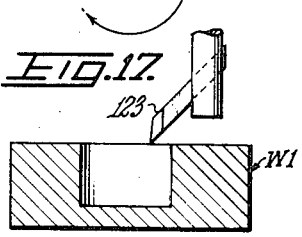
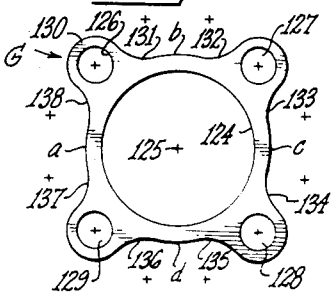
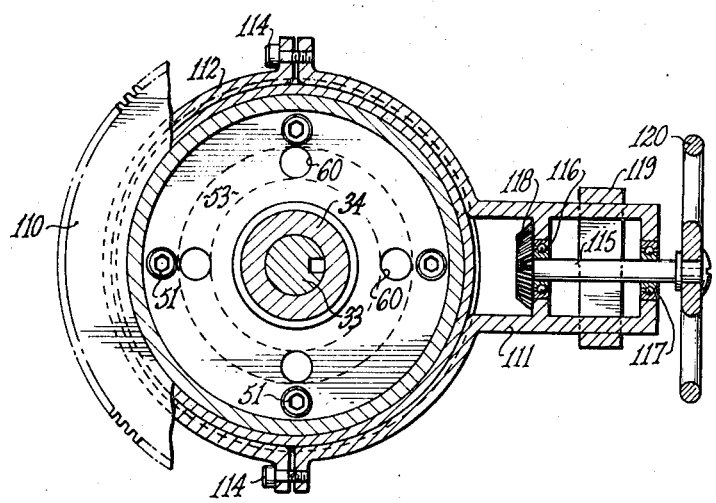
INVENTOR.
FRANCISCO ESCOBEDO
BY
Howard L. Johnson
ATTORNEY

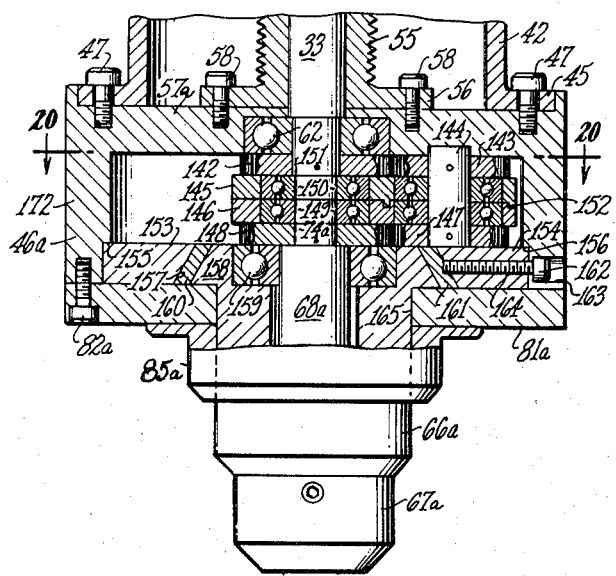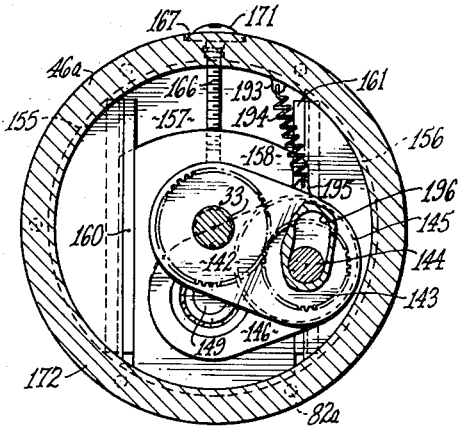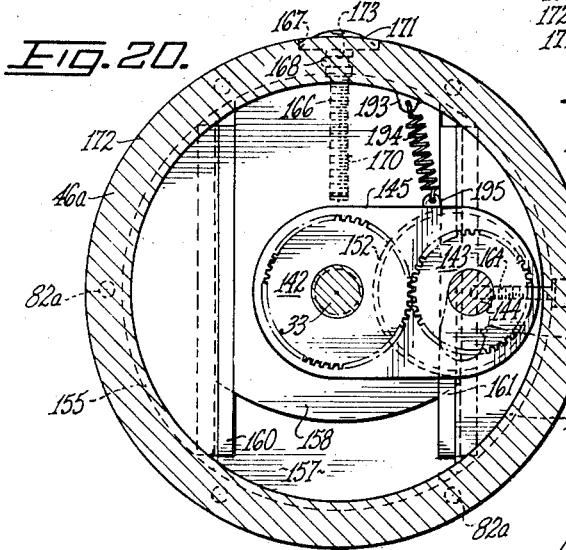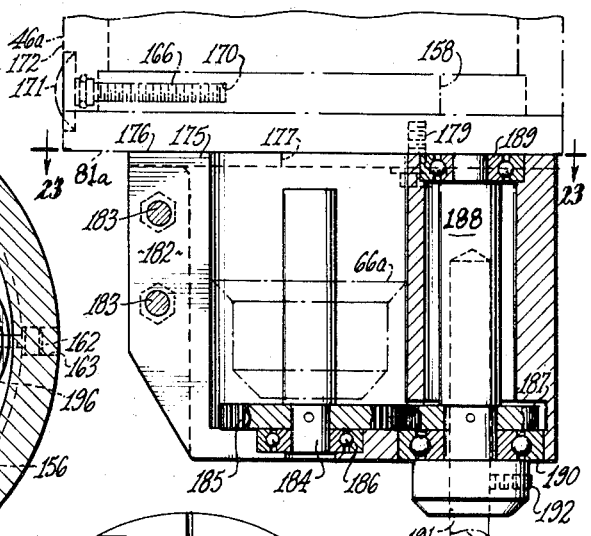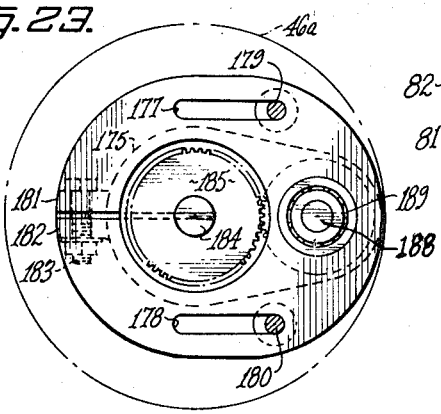
INVENTOR.
FRANCISCO ESCOBEDO
BY
Howard L. Johnson
ATTORNEY

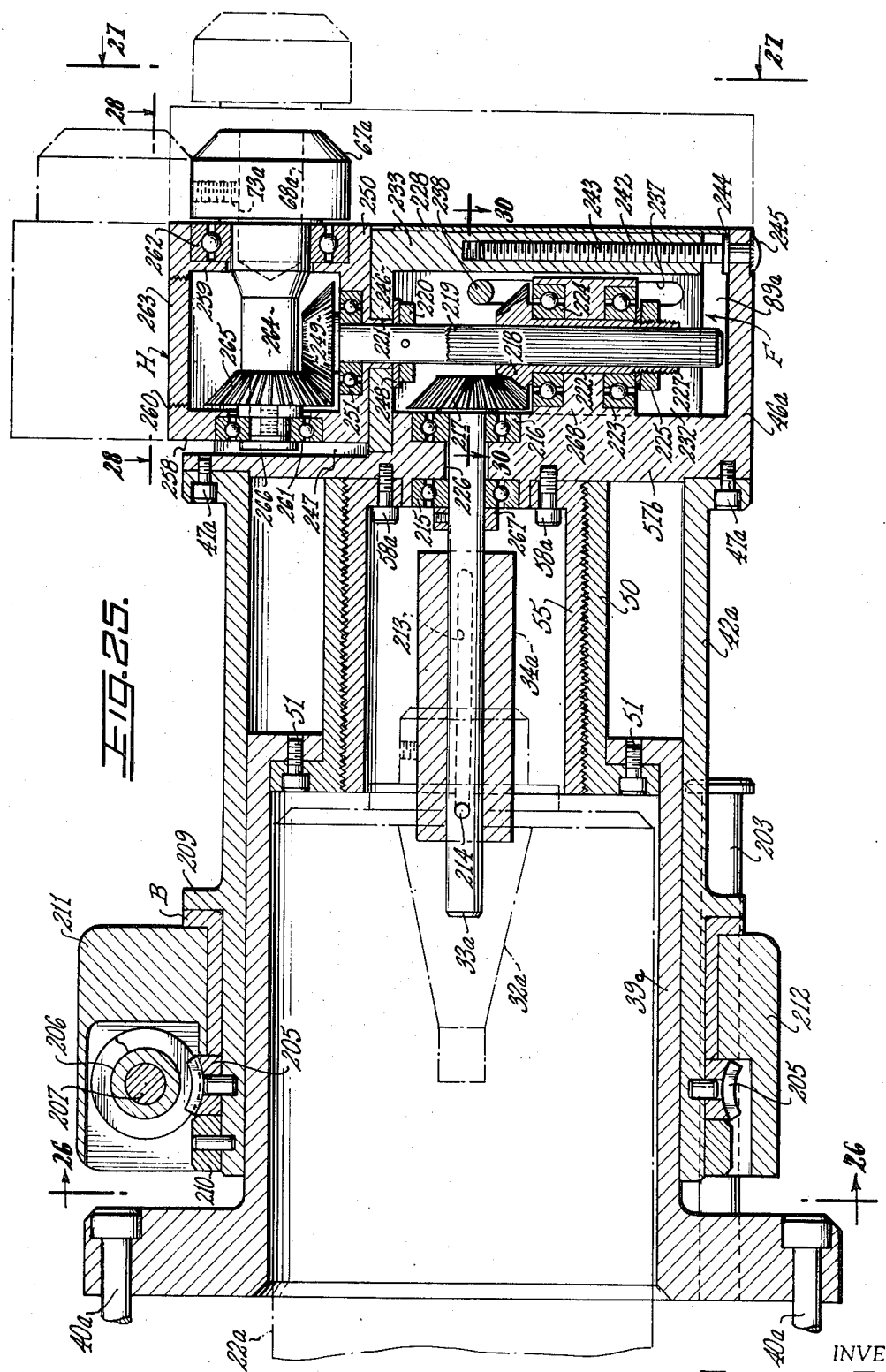

INVENTOR.
FRANCISCO ESCOBEDO
BY
Howard L. Johnson
ATTORNEY

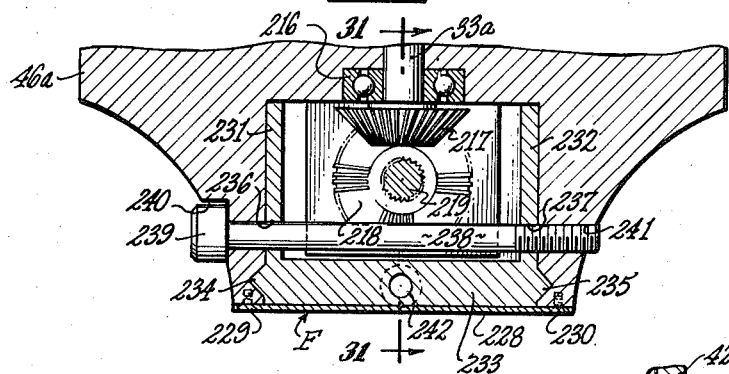
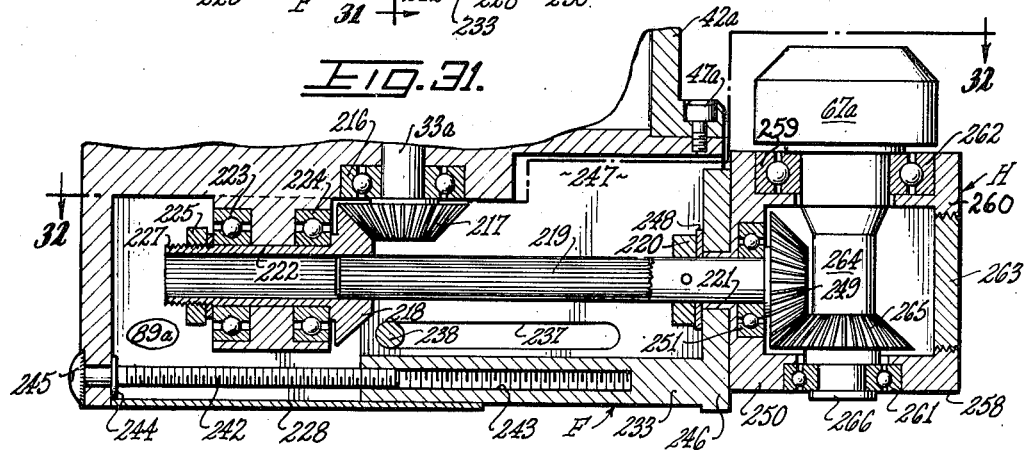
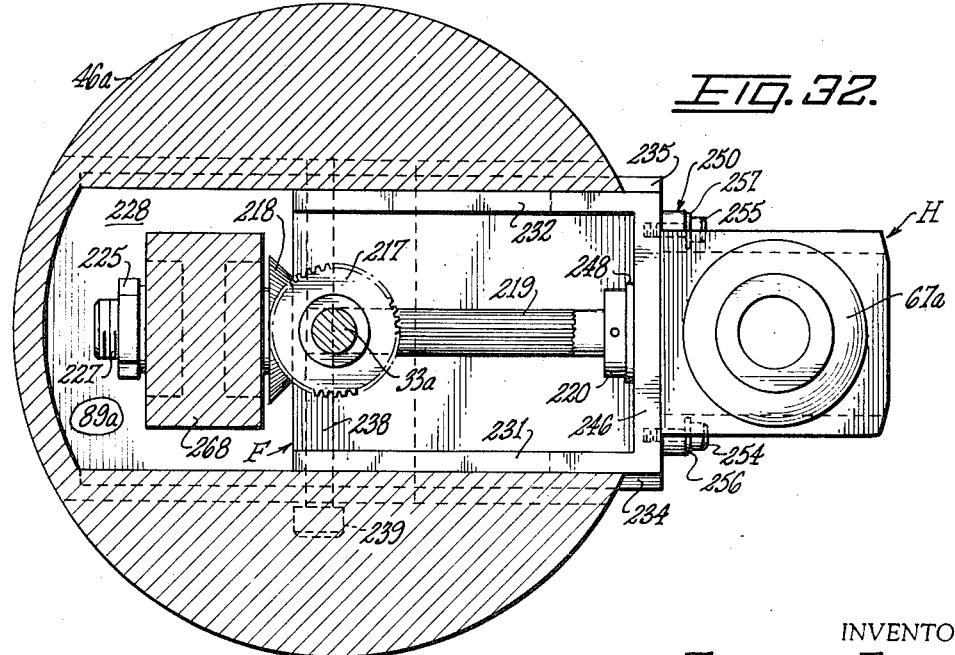

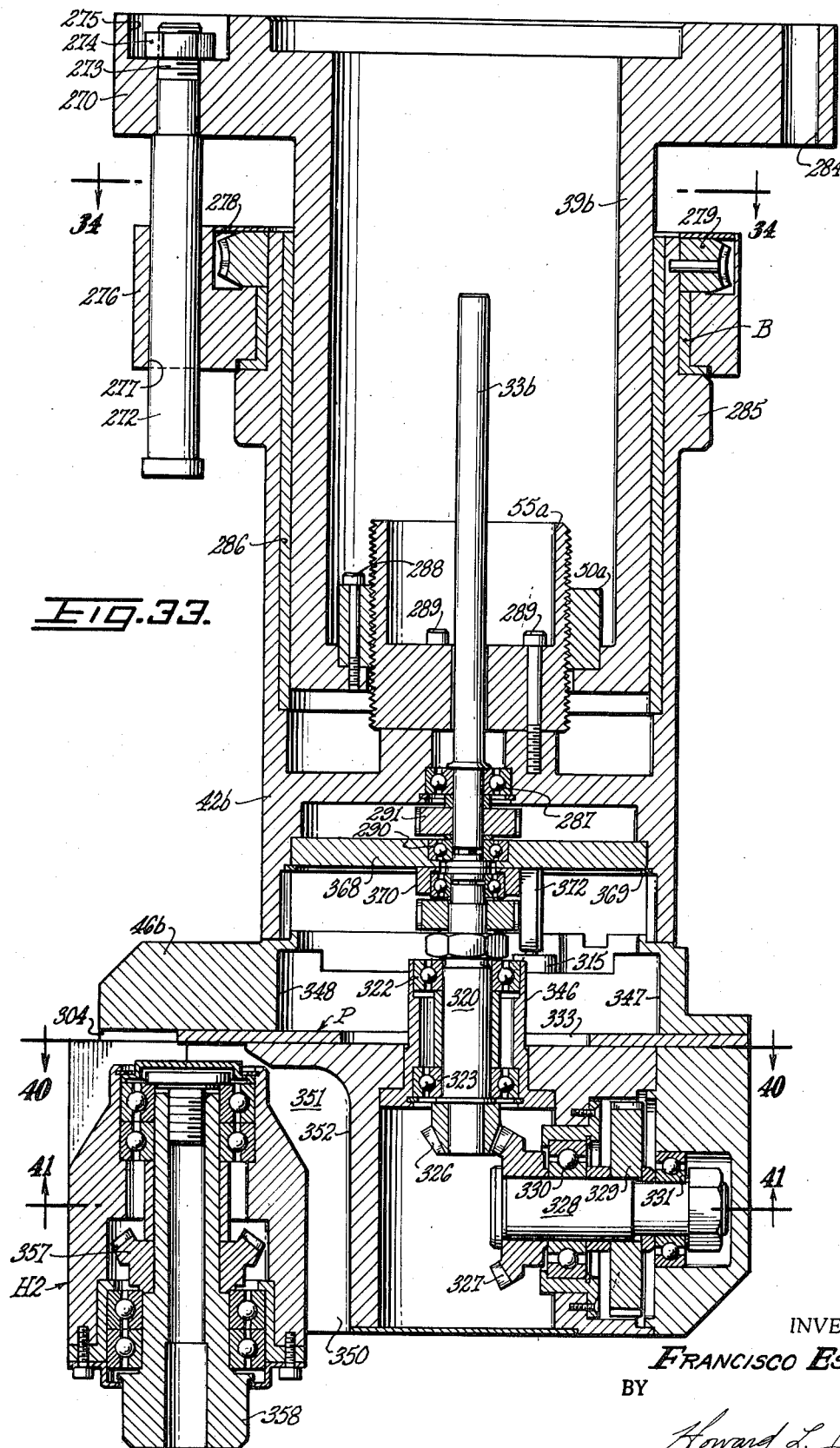

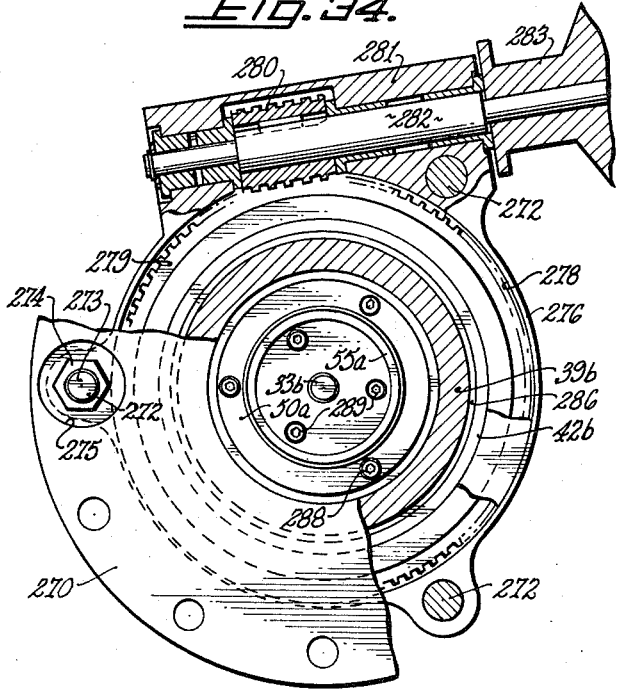
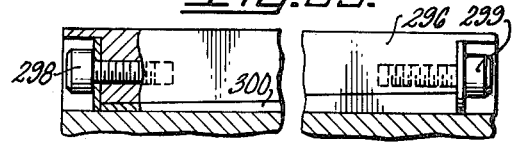
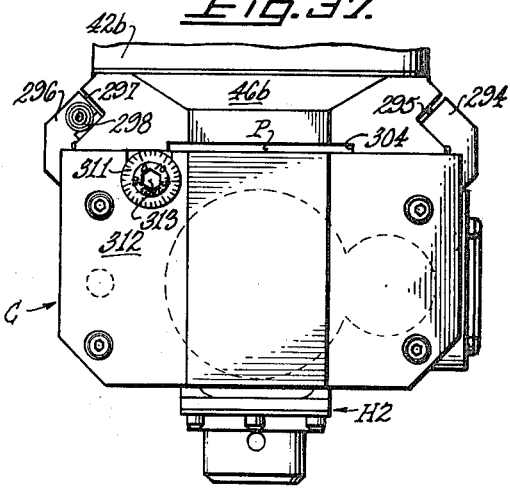
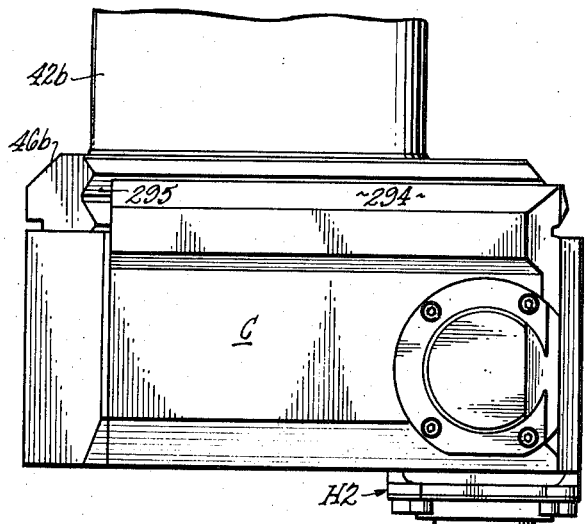
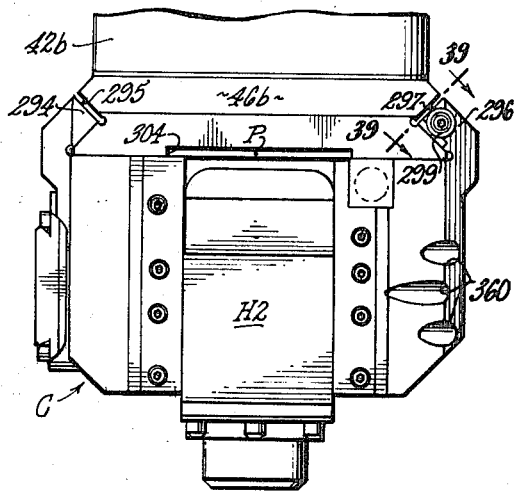
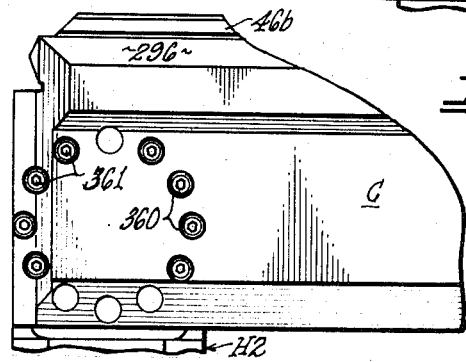

INVENTOR.
FRANCISCO ESCOBEDO
BY
Howard L. Johnson
ATTORNEY

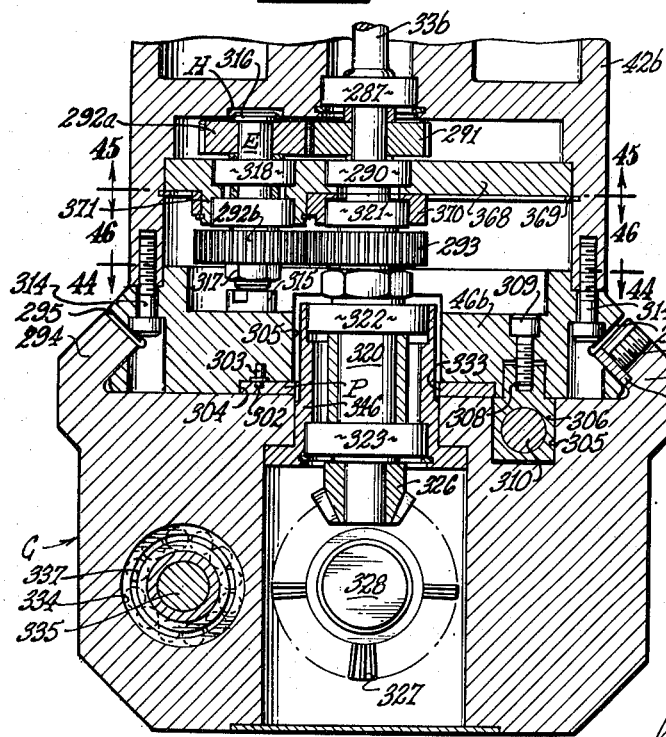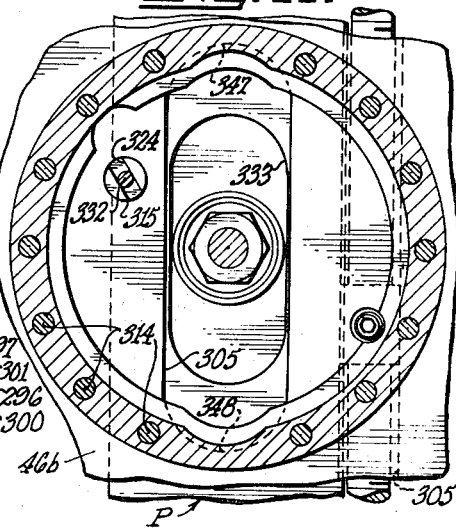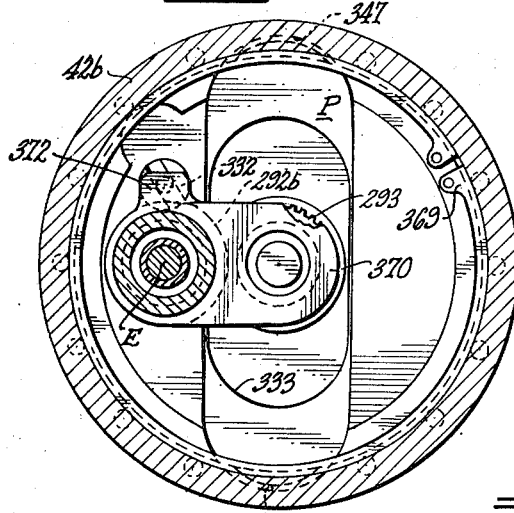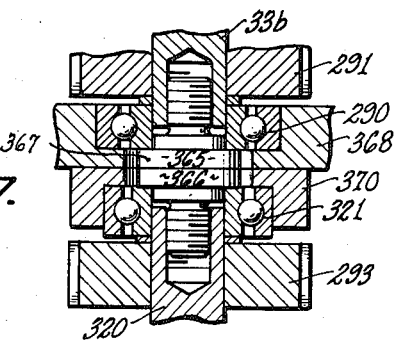

INVENTOR.
FRANCISCO ESCOBEDO
BY
Howard L. Johnson
ATTORNEY

3,690,220

HELICALLY-TRACKING MILLING ASSEMBLY WITH TILTABLE THREAD CUTTING HEAD

BRIEF DESCRIPTION OF THE INVENTION

This is a continuation-in-part of my application Ser. No. 731,494, filed May 23, 1968, now U.S. Pat. No. 3,526,167.

The earlier application disclosed a construction for disposing a rotary cutter at variable distances laterally offset from a powered drive shaft such as that of a milling machine, and for simultaneously moving the milling cutter in a selected spiral path so as (among other functions) to cut threads on an annular workpiece or within a cylindrical bore. The pitch of the formed threads is the pitch of the selected pair of interchangeable, cylindrical guide sleeves which are inserted within a telescopic column of the structure. The present invention adds to this basic construction, a drive train for further laterally offsetting the cutter and for reversing its axial orientation 180°, in association with means for selectively tilting the cutting head so that the head may conform to the slant or inclination of the thread being cut. Thus square threads or buttress threads can readily be cut by having the rotary cutting head slanted to the angle of the helix. Previously such threads were cut by mounting the workpiece on a lathe in axial alignment with the drive shaft of the (prior art) cutter and then rotating the lathe. Now this is no longer necessary. Workpieces of unsymmetrical shape or too large to be rotated can have a bore threaded while they remain stationary.

The present tiltable head which carries the rotating cutter may be set at any rotational position through 360°. In addition, the direction of drive can be reversed 180°. One construction for the present drive train attachment is shown in FIGS. 25–32 and comprises a longitudinally movable, externally splined shaft which is driven by a pair of bevel gears from the axially displaceable drive stem, one of the bevel gears having a tubular, longitudinally ribbed or internally splined shaft in which the externally splined shaft is slidably received. The distal end of the slidable shaft is journalled within a hollow cubical, head unit where it carries a bevel gear which ultimately drives a cutter-carrying spindle, the head being pivoted for positional setting about the axis of the bevel gear. The head can thus be set at any desired angle of rotation so as to slant the cutter relative to the helix which it is forming on the workpiece.

Another construction for achieving a comparable result is shown in FIGS. 33–51 whereby the tiltable positioning head can be disposed within a bore with its direction of drive inverted 180° and the cutter then inclined that it cuts a thread having a plane perpendicular to the bore. Such a construction begins with the previous rotatable housing having its split-trio gear train. The housing carries a transversely slidable undercarriage which is (calibratedly) movable with the scissors action of the gear trio. A projecting end of the housing carries a tiltable positioning head by which the ultimate cutter spindle can be set at any selected angle.

Thus by use of the telescopic unit and interchangeable pairs of threadedly engaged guide cylinders, and with various gear extension means for the transverse carriage, there is provided an adjustable helical tracking assembly which projects a rotary cutter, the path of which is not dependent on the drive means employed for the distal rotary cutter.

DESCRIPTION OF THE DRAWINGS

FIG. 1 is an axial sectional view of my milling head, with some portions broken away and some parts shown in elevation.

FIG. 2 is a top plan view as seen along the line 2—2 of FIG. 1.

FIG. 3 is an elevational view as seen along the line 3—3 of FIG. 2, with a portion broken away to show a lock pin.

FIG. 4 is a bottom plan view as seen along the line 4—4 in FIG. 1.

FIG. 5 is a transverse sectional view taken along the line 5—5 of FIG. 1, and particularly showing the adjusting screw and slide block.

FIG. 6 is a transverse sectional view taken along the line 6—6 of FIG. 1, showing the locking elements in broken lines.

FIG. 7 is a detail view through the gear housing, taken along the line 7—7 of FIG. 5, and showing the locking elements in elevation.

FIG. 8 is an axial section through the gear housing taken along the line 8—8 of FIG. 5, with parts in elevation.

FIG. 9 is an elevational view of a portion of the gear housing, showing the head of the adjusting screw as seen along the line 9—9 of FIG. 5.

FIG. 10 is an axial section taken through the drive stem (seen in elevation) and particularly showing (in place of the threaded guide cylinders of FIG. 1) a pair of unthreaded cylinders which prevent axial separation or spiral movement of the drive shaft and driven shaft.

FIG. 11 is a top plan view of a workpiece, showing a cutter used with the threaded guide cylinders of FIG. 1 to form interrupted threads in two adjacent bores of a workpiece.

FIG. 12 is a transverse sectional view taken through the workpiece of FIG. 11 along the line 12—12.

FIG. 13 is an elevational view of the upper portion of the milling head, partly broken away or in section, which head has been modified by incorporation of a hand-crank for rotationally positioning the driven end.

FIG. 14 is a transverse sectional view taken along the line 14—14 of FIG. 13.

FIG. 15 is a transverse section through an annularly drilled and centrally threaded workpiece, showing how two different groove-cutting tools may then be used with the present head, respectively to cut a side groove and to mill a bottom channel.

FIGS. 16 and 17 are, respectively, top and vertical sectional views of a workpiece showing how a fly cutter can be used with the present head to shave or level the top surface of a workpiece.

FIG. 18 is a plan view of a head gasket for a single cylinder of an engine, which gasket can be formed in such configuration from sheet metal by the present milling head.

FIG. 19 is an axial sectional view through the gear housing, with parts in elevation, and particularly showing a modified construction of shift block for the gear train mounted thereon.

FIG. 20 is a transverse sectional view taken along the line 20—20 of FIG. 19, with the gears in position to transmit rotary motion to a concentrically disposed shaft.

FIG. 21 is a similar view with the gears in position to drive an offset shaft.

FIG. 22 is an axial sectional view of an adapter unit shown attached to the head of FIG. 19.

FIG. 23 is a transverse section taken along the line 23—23 of FIG. 22.

FIG. 24 is a similar view along line 24—24 of FIG. 1, of an adapter attached to the head of FIG. 1 (with the cover plate 85 removed).

FIG. 25 is an axial sectional view similar to FIG. 1 but with a modified drive- and positioning-assembly coupled to the drive shaft of the milling machine, with the possible lateral and axial projections indicated in phantom.

FIG. 30 is an axial sectional view taken along the line 30—30 of FIG. 25, particularly showing the lock mechanism.

FIG. 31 is a sectional view taken at right angles to FIG. 30 along the line 31—31.

FIG. 32 is a staggered transverse section taken along the line 32—32 of FIG. 31.

FIG. 33 is a longitudinal axial section, partly in elevation, of another tiltable head construction.

FIG. 34 is partially a plan view and partially a transverse section, as viewed along the line 34—34 of FIG. 33.

FIG. 35 is a side elevational view of the lower portion of FIG. 33 as viewed from the rear of FIG. 33, or as seen from the left side of FIG. 38.

FIG. 36 is a fragmental elevation of the right side of FIG. 38.

FIG. 37 is an end elevational view as seen from the left of FIG. 35.

FIG. 38 is an elevational view of the opposite end of FIG. 37.

FIG. 39 is a sectional view taken along line 39—39 of FIG. 38 and showing the tapered adjustment wedge.

FIG. 43 is a transverse axial sectional view taken through the lower portion of FIG. 33 at right angle thereto, with portions in elevation.

FIG. 44 is a sectional view taken along the line 44—44 of FIG. 43.

FIG. 45 is a sectional view taken along the line 45—45 of FIG. 43.

FIG. 46 is a sectional view taken along the line 46—46 of FIG. 43.

FIG. 47 is an enlarged detail in axial section, showing adjacent shaft ends which carry the first and last gears of the split-trio gear train, the transverse center line of this figure corresponding to the upper section line of FIG. 43.

DESCRIPTION OF ONE EMBODIMENT

Figure 26:
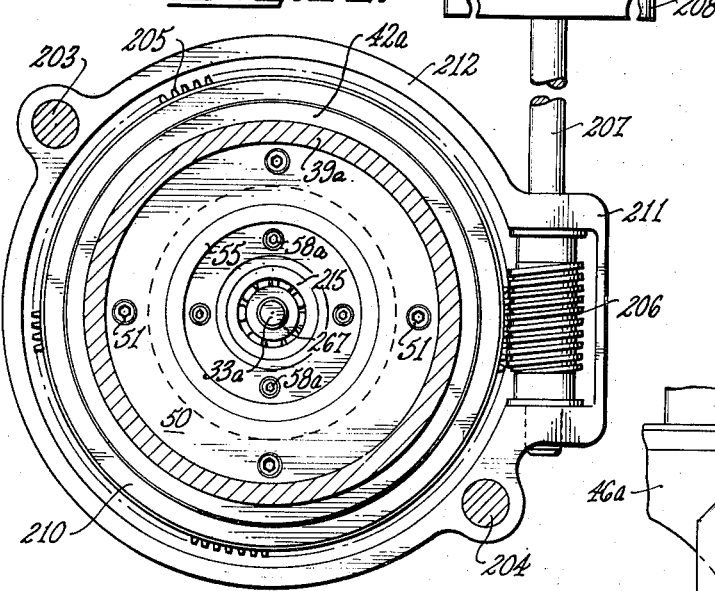
FIG. 26 is a transverse section taken along the line 26—26 of FIG. 25 and particularly showing the manually operable worm gear used to obtain spiral movement of the outer gear housing relative to the inner housing.
Figure 29:
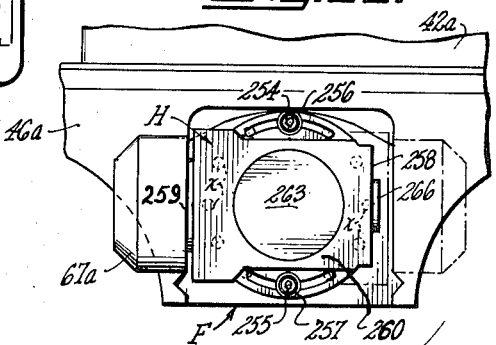
FIG. 29 is similar to FIG. 28 but with the head rotated 90° in the direction of the arrow.
Figure 27:
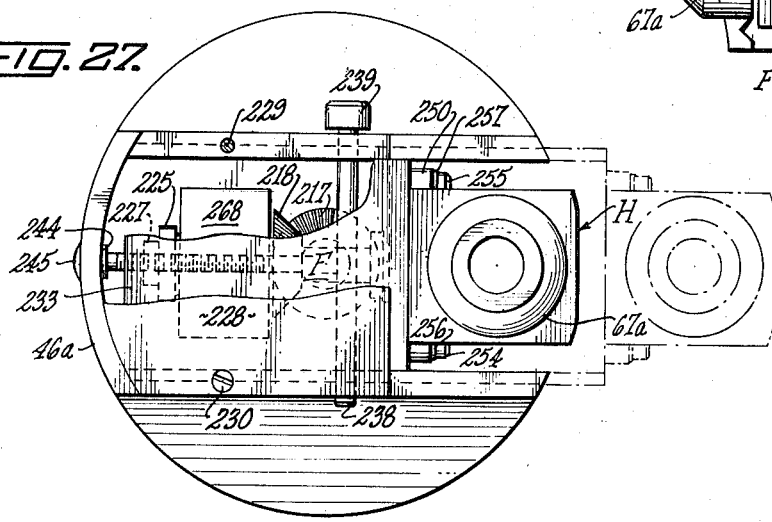
FIG. 27 is a bottom plan view of the construction of FIG. 25 with parts broken away.
Figure 28:
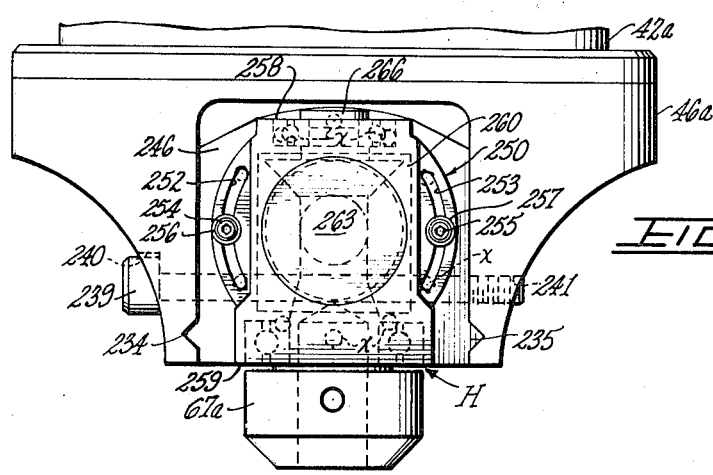
FIG. 28 is an elevational view of the lower portion of FIG. 25 as viewed along the line 28—28.
Figure 40:
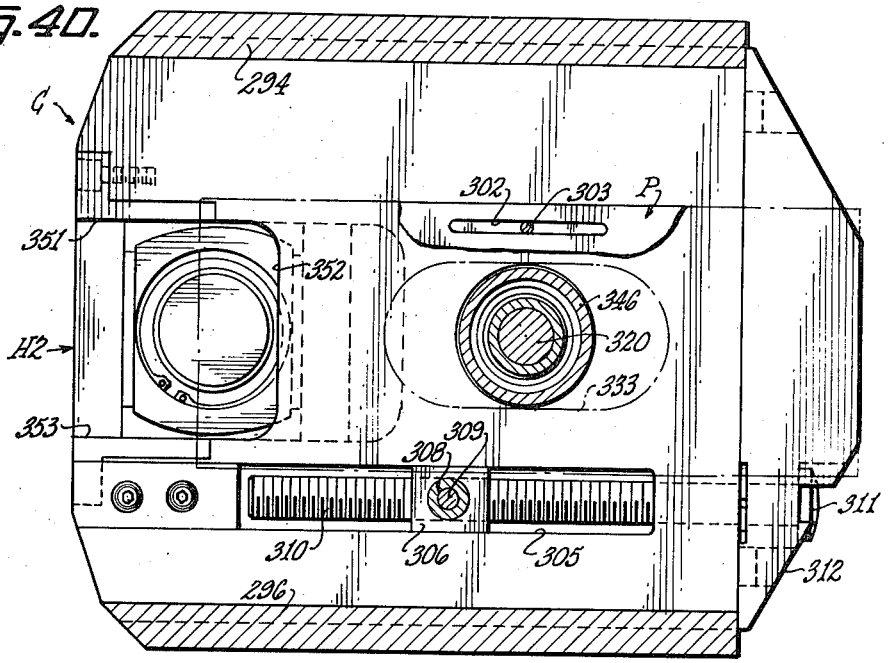
FIG. 40 is a transverse section along line 40—40 of FIG. 33.
Figure 41:
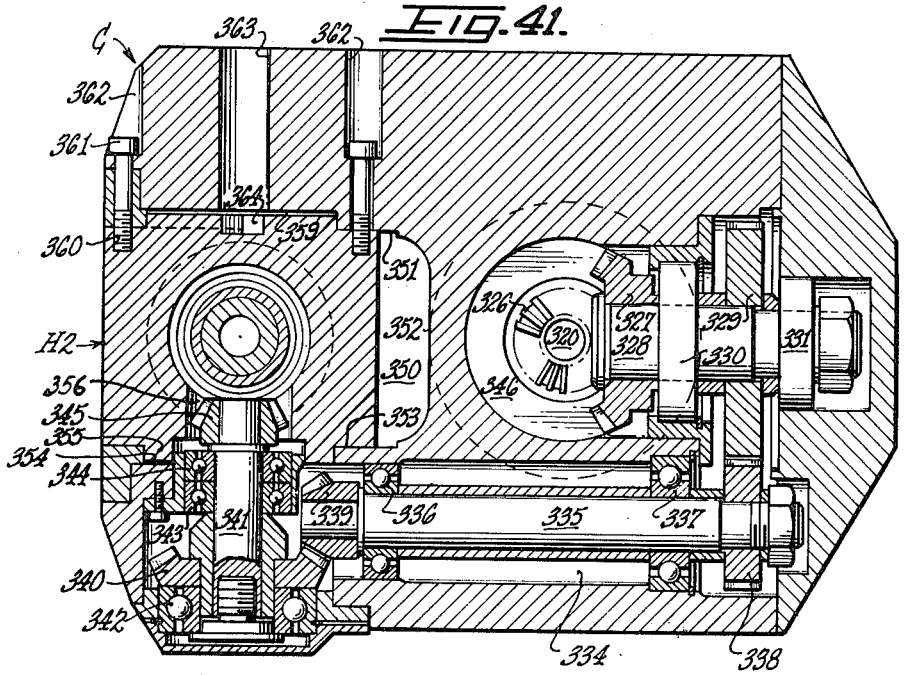
FIG. 41 is a transverse section taken along line 41—41 of FIG. 33.
Figure 42:
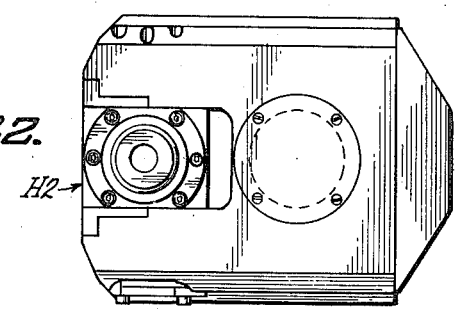
FIG. 42 is a bottom plan view of FIG. 35 on a smaller scale.
Figure 48:
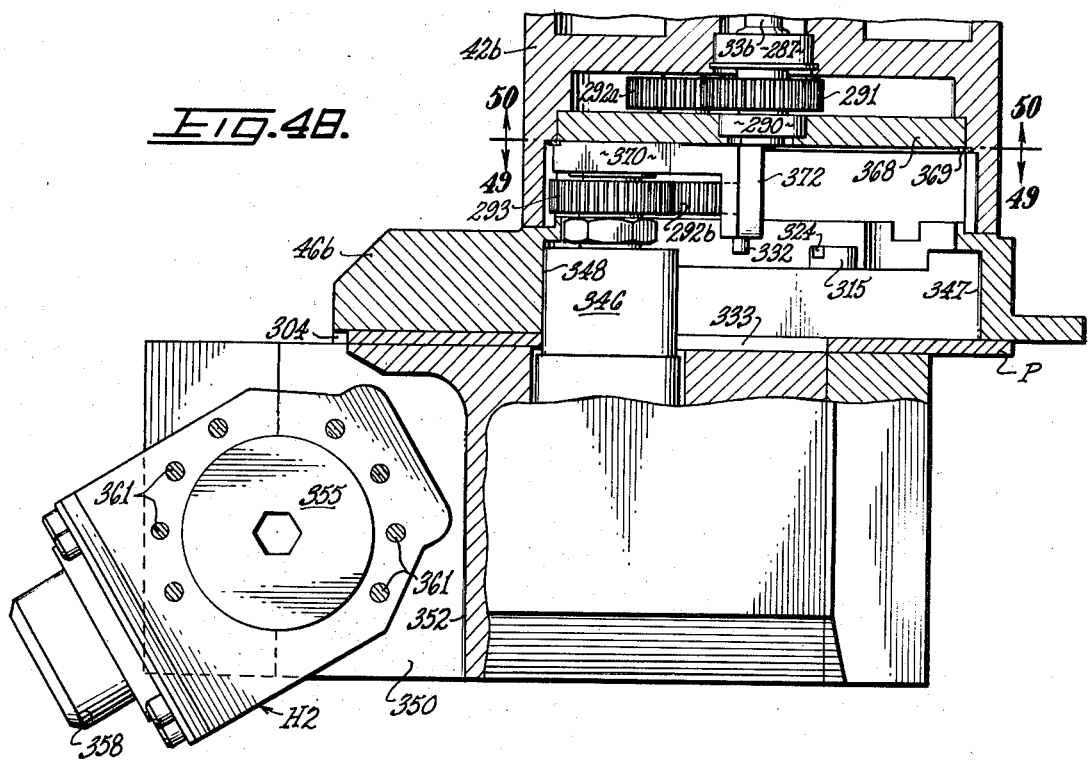
FIG. 48 is an axial sectional view taken at right angle to FIG. 43, partly in elevation, with the undercarriage at its extreme left position.
Figure 49:
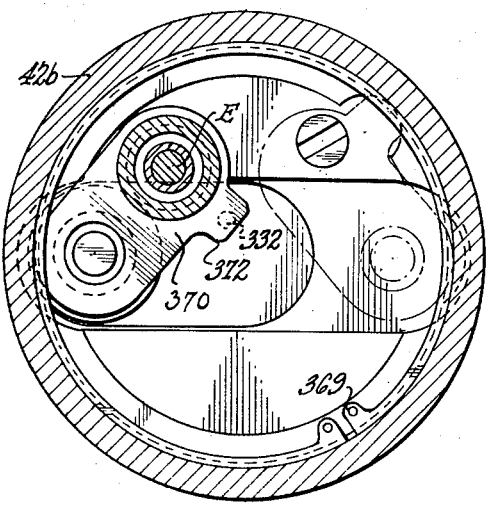
FIG. 49 is a transverse sectional view taken along the line 49—49 of FIG. 48.
Figure 50:
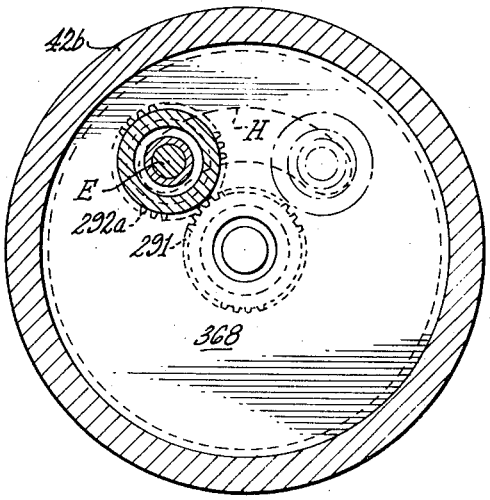
FIG. 50 is a transverse sectional view taken along the line 50—50 of FIG. 48.

As seen particularly in Figs. 1–3, the stationary or upper housing member 20 of my milling head attachment is formed as a tube or collar, longitudinally split at 21, and in mounting has its adjacent side edges drawn together and clamped tight about the quill 22 of a milling machine (not shown) by means of a pair of radially outwardly projecting shoulders 23, 24, which are selectively held together by pull screws 25, 26. One-half of the housing tube 20 is permanently fixed to the underbody by lock pins 18, 19 (FIGS. 2,3). Along one side of the housing, a thumb screw 27 is received in a tapped aperture 28 after passing through a longitudinal slot 29 of an L-shaped stop member 30 which is thus adjustably positioned and held against the outer face of the housing at any desired position along the length of the slot, for a purpose detailed below.

Concentrically centered within the housing 20 and quill 22, the conventional draw bar 31 and collet 32 of the milling machine spindle $S_p$ are coupled to an axially movable stem or drive shaft 33 of the adapter by means of a sleeve 34 which carries a row of hardened pins 35,36,37, having their inner ends riding in a longitudinal slot 38 of the stem 33. The coupled shaft or stem 33 is thus rotated in unison with the sleeves 34, collet 32 and spindle $S_p$, but due to the slot or guideway 38, the stem 33 can move lengthwise at the same time, the pins 35, 36, 37 acting like a key.

The upper housing 20 dependently carries an intermediate housing formed of a concentric pair of tubular "telescoping" cylinders, the inner one 39 of which is fastened to the upper housing by a circle of screws 40. The outer cylinder 42 is lengthwise and rotationally slidable about the inner cylinder 39 and is formed with an upper, outward-projecting ledge 43 which is positioned for abutment with the inturned arm 44 of the L-shaped stop 30. A lower terminal ledge 45 of the outer cylinder is fastened to a lower- or gear-housing 46 by a circle of screws 47.

Within the open center 49 of the inner telescoping tube 39, an internally threaded guide cylinder or insert 50 is removably mounted by means of a circle of screws 51 inserted jointly through a top flange 53 of the insert 50 and through an inwardly projecting shoulder 54 of the inner tube 39. An externally threaded guide cylinder or insert 55 (having threads of the same pitch as those of the insert 50) has a lower flange 56 fastened to the top of the housing plate 57 by a circle of screws 58. Access to these last screws for a manipulating tool is by way of a corresponding circle of openings 60 in the flange 53 of the inner insert 50.

At its lower or distal extremity, the drive stem 33 traverses a bearing collar 62 and has its end fixed to a cylindrical gear wheel 63 which is thus centered within the annular chamber 64 of the rotatable gear housing member 46. Slidably movable transversely (i.e., in a diametric plane) within the chamber 64 is a shift element or slide block 65, generally oval in plan view (FIG. 5) and with a flat top 52 and bottom 59 faces disposed in sliding registration with the corresponding top 96 and bottom 97 ends of the chamber 64. Fixedly projecting from the lower or distal face 59 of the block 65 and extending through the housing opening 84 (FIG. 6) is a turret 66 which houses a spindle 67 having a bored stem 68 which is journaled between lower 69 and upper 70 bearings within turret 66. A drive shaft 71 for a cutter 72 or other rotary tool is detachably held in the bore of the spindle 67 by a set screw 73. Proximately, the hub or reduced end of the socketed stem 68 fixedly carries a cylindrical gear 75 which is thus paired in size and direction of rotation with the gear 63 which is from time to time directly (that is, concentrically) above it within the block 65, the gear 75 thus being retained in a lower socket or cavity of the slide block 65.

The slide block 65 is formed with an upward-opening, multi-level cavity 76 (FIG. 1), and is pivoted on a stub shaft 77 which carries an intermediate gear 83 which is equal to the axial thickness or height of both members of the pair of gears 63, 75 and engages both of them at all times so as to transmit rotary drive (in the same direction) from the stem gear 63 to the ultimate drive gear 75. However, depending upon the position of the slide block 65 which swings transversely on the shaft or axis of the intermediate gear 83, the paired gear 75 is selectively axially aligned or disaligned with its corresponding gear 63; this correspondingly aligns or disaligns the ultimate drive shaft 67 (71) with the stem 33 and driving shaft Sp. The upper gear 63, however, remains at the same location within the housing 46, regardless of shifts of the lower gear 75 by the slide block 65, but its position within the cavity of the slide block changes. The stub shaft 77 which in effect is the pivot for shift of the gear 75 relative to gear 63, is journalled in the three bearing assemblies 78, 79, 80.

Looking at it in another way: the intermediate gear 83 has an axial height of "two units" and is retained in a corresponding cylindrical portion of the cavity 76 by the stud shaft 77. The permanently located drive gear 63 projects into an adjacent cavity area 76a (FIGS. 5 and 8) of "one unit" height but of greater lateral width than the drive gear. In shifting of the slide block 65, these two engaged gears 83 and 63 retain their positions within the housing 46, but the slide block while it embraces or contains them, also moves in relation to them and transversely carries the third engaged gear 75 which is retained in a cavity of "one unit" height in the block, which last cavity portion closely surrounds the gears. Thus, in moving, the slide block carries this lower gear 75 with it, that is, from a concentric position directly beneath the drive gear 63, to a position laterally offset or eccentric thereto - at the same time carrying the turret 66 and ultimate driven shaft 67. The transverse movement of the slide block is made possible by the lateral extent of the upper "one unit" cavity 76a, which is moved sidewise in respect to the stationary drive gear 63. A somewhat larger, oval opening 84, corresponding to the just-mentioned slide block cavity, when the latter is in concentric position, is formed in the housing end plate 81, and allows the projecting turret 66 to move sidewise in this opening with movement of the slide block (FIGS. 5–6). A cover plate 85, having a collar 86 secured to the turret by screws 48, is slidably disposed overlying this opening 84, upon movement of the turret 66 (FIG. 1). The end plate 81 is fixed to the housing 46 by a circle of screws 82 (FIG. 4).

One apical end of the slide block 65 is formed with a transverse channel or slot 87 (FIGS. 1 and 5), disposed generally parallel to the top and bottom faces of the block, and the block is also drilled to form a cylindrical opening 88 which traverses the axial thickness or height of the block. A flat-ended, cylindrical plug 89 is rotatably disposed within the cannel 87 with its ends flush with the corresponding outer faces of the block 65. An elongated screw 90 is inserted through an opening 91 of the annular housing 46, with its inner end received through a tapped, diametric opening 92 of the plug 89. Adjusting screw 90 is formed with a flared head 93 bearing calibrated measurement indicia, and having an annular groove 94 surrounding its shank, which groove receives a fixed pin 95 (FIG. 5) along one side after insertion through the wall 46, thus preventing longitudinal movement of the screw. Accordingly, rotation of the screw 90 in one direction or the other, will move the threadedly engaged plug 89 lengthwise along the screw either toward or away from the head 93, and thus slide the block 65 in the same direction while it remains sandwiched between the top 96 and bottom 97 faces of the chamber 64. As explained earlier, this locates the dependently projecting turret 66 and cutter shaft 71 at the desired eccentric position relative to the upper shafts 33, 31.

Lock means are also provided to hold the slide block at any such selected location. A right-angled passage 98 (FIGS. 5,6,7) is formed in the end plate 81 horizontally underlying the slide block 65; two cylindrical pins 99, 100 having complementary (45°) angled engaging end-faces 101 are housed lengthwise-slidable in the respective channel portions. A set screw 102 is located in an outer tapped section 103 of the passage, such as a socket-head screw which is readily operable by a tool (not shown). Accordingly, small rotation of the screw 102 serves to push the pin 100 lengthwise inward and this raises the mating pin 99 perpendicularly upward so as to abut or frictionally engage the underface of the slide block 65 and prevent its further movement within the chamber 64.

In the construction detailed in FIG. 10, the cylindrical pair of threaded sleeves or inserts 50, 55 shown in FIG. 1 are replaced by unthreaded inserts 104, 105 which are locked together for relative annular movement by ball-bearing raceways 106. Accordingly, the two inserts do not move axially with respect to each other. Such inserts are used, for example, when cutting a single groove 107 in the side of a bore, as with the key cutter 108 of FIG. 15. Rotation of the outer cylinder 42 now serves merely to move the eccentric turret 66 and its particular cutter (108) around the bore 109 of a workpiece, but always at the same height.

The construction illustrated in FIGS. 13–14 provides a hand-crank unit for rotating the lower housing (42,46) and cutter (108,72) up or down (relative to the fixed upper housing 20, and consequently to a workpiece W) when using the pair of threaded inserts 50,55, or at a constant level when using the unthreaded inserts of FIG. 10. An upper flange of the outer cylinder 42a is formed as a bevel gear 110. A rectangular mounting frame 111 is attached to the housing by a split collar 112 which is loosely retained in an annular groove 113 by a pair of screws or bolts 114. A radial shaft 115 journaled in bearings 116, 117 disposes a pinion 118 in driving engagement with the bevel gear 110. The frame 111 is retained within a rectangular yoke 119 to permit its movement axial to the shafts 33,31 and also to furnish limit means similar to that of the abutment arm 44 of FIG. 1, the pinion shaft 115 being operated by a crank or hand wheel 120 (or with a drive motor if desired). Without such crank assembly, the adapter head can of course be turned by manually grasping the tube 42 or the gear housing 46. However, in either case, it will be observed that the lower housing (42,46) need not be turned at a constant speed, and its direction may be reversed at will (or stopped) in its travel along the spiral path which is determined by the threads of inserts 50, 55. This does not alter the constant rotation of the carried cutter 72, 108, however. The outer face of tube 42 is provided with an encircling band of angular indicia S (FIG. 13) to indicate the arcuate distance through which the lower housing 46 (and its dependent cutter 72) is rotated.

In the construction of FIGS. 19–21, the drive stem 33 has its lower end journaled in the bearing raceway collar 62 as before, and then terminally attached to a cylindrical gear 142 which engages a laterally adjacent gear 143 which is carried on a stub shaft 144 having its upper end received in a cross bearing channel 196 of the top plate 57a of the gear housing. The pivot shaft 144 traverses bearing assemblies in a flat-faced pair of juxtaposed slide plates, or links 145, 146 and has its lower end fixed to a gear 147 which engages a shiftable gear 148 (similar to gear 75 of FIG. 1) which shiftable gear is carried on the reduced end 74a of the driven shaft 67a. The end 74a extends upwards into a rotary bearing unit 149 of the lower link 146 while the corresponding end 150 of the drive stem 33 extends downward into a bearing unit 151 of the upper link 145. The two juxtaposed link plates 145, 146 are formed with mating surfaces designed for limited rotational movement about the axis of the stub shaft 144, by reason of a downward projecting, arcuate ridge or shoulder 152 (FIG. 19) of the upper plate which seats in a corresponding groove of the lower plate. Accordingly, the link plates — and their connected drive shafts 33, 67a — can be moved together or separated like the blades of a pair of scissors which are pivoted on the axis of the shaft 144; such movement serves to axially allign (FIG. 20) or offset (FIG. 21) the two shafts 33, 67a (71) while their drive connection is maintained at all times through the gear train. The lower link 146 thus takes the place of the socketed lower portion of the earlier slide block 65, which journals the two gears 75, 83 of FIG. 1. The upper link 145 takes the place of the housing plate 57 which journals the two gears 63, 83 of FIG. 1. The difference is that in the FIG. 19 case, the shafts of the two gears are shiftable instead of just one (74 in FIG. 1). In other words, the shaft 144 of the intermediate gear (now split into two fragments 143, 147) is now made shiftable while still serving as a pivot point. Consequently the corresponding slide block (158) can be moved in a straight line instead of arcuately as was necessary with the block 65. To aid in returning the gear train to concentric drive position (FIG. 20) from offset position (FIG. 21), a tension spring 194 connects a lateral ear 195 of the upper link plate 145 with a lug 193 on the inner face of the gear housing 46a.

The bottom plate 81a of the gear housing is formed with two upward extensions 153, 154 having their upper arcuate edges lodged beneath corresponding shoulders 155, 156 of the inner housing side wall and with mutually facing, inner beveled edges jointly forming a transverse or diametric channel 157 across the floor of the housing. A pair of corresponding angled, elongated, rectangular gibs 160, 161 line the sides of the channel. The top of the turret 66a is formed with a wedge-shaped projection 158 which is shorter than and slidable lengthwise along the channel which it contacts on both sides; the wedge carries a bearing unit 159 which journals the socketed stem 68a which the latter upwardly terminated in the reduced end 74a which carries the gear 148. Accordingly, as the wedge 158 is moved back and forth along the channel 157, it correspondingly locates the turret 66a along the length of the oval bottom opening 165 in the plate 81a through which the turret projects. This shifts the driven shaft 67a between axial alignment with the drive shaft Sp, 33 (the position of FIG. 20) and the offset position of FIG. 21. The wedge 158 is locked in any such selected position by means of a screw 162 which is received through a bore 163 of the side housing 172 and threadedly engaged in a tapped opening 164 of the projection 154, with its inner end in frictional abutment with a ledge of the gib 161. An adjusting screw 166 has its head 171 rotatably seated in a recess 167 of the housing side wall 172 and there anchored against axial displacement by a pin 168 (FIG. 20) inserted through a vertical bore and lodged in an annular groove 173 formed around the neck of the screw. The inner end of the screw is received in a radially directed, tapped bore 170 of the sliding wedge 158, which bore is parallel to the sides of the slide channel 157.

FIGS. 22–23 show an adapter unit for positioning the driven shaft (67a) at a further offset position from the initial drive shaft (Sp, 33) which adapter may thus be used in order to position a cutter to cut large diameter openings, grooves, threads, scallops, etc. The cover 85a of FIG. 19 is first removed and to the nonrotating turret 66a, there is affixed a partially open-top housing tube 175 having a top flange 176 formed with a pair of parallel slots 177, 178 disposed to receive attachment bolts or screws 179, 180 for coupling it to the underface of bottom plate 81a. Split wings 181, 182 along one side of the housing are provided with transverse, threaded fasteners 183 for drawing the parts tightly together Within the housing, a spindle 184 has its upper end fixed in the rotary socket 68a and distally carries a gear 185 with the spindle end being journaled in bearing unit 186. A parallel spindle 188 having its ends journaled in bearing units 189, 190 carries a gear 187 which is driven by gear 185 and disposes a socket 191 and set screw 192 for anchorage of the shaft of a selected cutter.

A similar adapter unit (FIG. 24) is provided for attachment to the bottom of the head of FIG. 1, upon removal of the cover plate 85. The flange plate 197 is secured to the underface of housing plate 81 by bolts 201, 202 inserted through curved slots 199, 200. These are located to allow pivoting of the flange 197 about the point 198 (before tightening the bolts 201, 202) so as to accommodate to a particular offset position of the projecting turret 66.

By having the workpiece on a milling table (not shown) the table can be used to raise or lower the workpiece and thus permit cutting grooves at different heights. By use of an end mill 121 (FIG. 15), bottom grooves 122 can be cut; or with a fly cutter 123 (FIG. 16–17) an uneven surface can be leveled or shaved, either by moving the rotating cutter in a large enough circle to sweep the workpiece, or by moving the workpiece by means of the milling table.

As further illustrative examples of usage of my composite milling head: The head gasket G of FIG. 18 can be formed on a milling table. With the cutting end 121 of FIG. 15, the central annulus 124 is removed and the concentric cuts a, b, c, d, are made, in each case with the driven shaft 71 disposed at a circumference of a circle based on the point 125 which corresponds to the central axis of shafts 31, 33; this is when using the pair of non-spiral guide inserts of FIG. 10 (104, 105). The four cutouts 126, 127, 128 and 129 are similarly drilled or cut (depending upon their size) by radiusing the cutter from the corresponding centers. In such manner, scalloping or profiling of numerous workpiece intended for various specialized uses can be made. Straight cuts can be made simply by moving the milling table in a straight line, without arcing the cutter shaft 71. But any desired radius for a curved cut can be quickly set, simply by adjusting the off-center position of the turret 66 by means of the slide block 65, positioning screw 90 and lock 99, 100, 102 of FIG. 1; or by setting the sliding wedge 158 of FIG. 19. However in making such cuts with an end mill 121, the spiral guide inserts 50, 55 need not be replaced by the non-spiral inserts 104, 105, since a simultaneous small axial displacement of the cutter would be immaterial. For larger diameter arcs or circles, the adapters of FIGS. 22—24 are used.

Use of a thread cutter 72 with the present milling head is particularly effective in cutting interrupted threads (FIGS. 11–12) in intersecting bores 139, 140, since the vertical margin 41 of the two bores does not result in a jagged or torn edge as may be the case when using a conventional tap. Likewise, the problem of supporting such tap in threading an interrupted bore does not arise with the present cutter.

DESCRIPTION OF SECOND EMBODIMENT

The component construction of FIGS. 25—32 is particularly designed to be attached to a stationary part of a milling machine, surrounding a horizontally-projecting spindle, as by bolts 40a inserted through an attachment flange. However, it can also be connected to a machine having a vertical spindle. The fixed member or inner telescopic cylinder 39a of the attachment is thus peripherally spaced from the spindle 22a and its axial collet 32a, sleeve 34a and the longitudinally movable drive stem 33a. Distally the fixed cylinder 39a supports a threadedly engaged pair of guide cylinders 50, 55, the former being fixedly secured to the cylinder 39a by a circle of screws 51. The inner guide cylinder 55 is distally secured to the rotatable gear housing member 46a by an inner circle of screws 58a. An outer housing cylinder 42a which movably embraces the fixed cylinder 39a, is terminally fastened to the gear housing by an outer circle of screws 47a, and proximately carries an external ring gear 205 pinned thereto, which ring gear engages a worm gear 206 on a drive shaft 207 which may be operated manually by a hand wheel 208, or mechanically if preferred.

Axially spaced apart along the outer telescopic cylinder 42a, are an abutment flange 209 and an annular band or ring 210 pinned to the cylinder 42a; between the flange and band, an encircling L-shaped collar 212 supports the worm gear housing 211, being separated from the rotatable cylinder 42a by a thrust bearing B. The collar 212 is axially slidable along the lengths of a parallel pair of distally headed, guide pins 203, 204 (FIG. 26) which have their proximate ends fixedly secured to the attachment flange of the fixed, inner housing tube 39a. The outer housing 42a thus can move lengthwise to the pins 203, 204 without it rotating; at the same time, the outer housing 42a may be rotated by action of the worm gear 206.

As in the previous embodiment, the inner guide cylinder 55 itself is spirally movable by its rotation about the threads of the outer cylinder 50 (simultaneous with rotation of telescoping outer cylinder 42a which is bolted thereto at 58a). In order to accommodate such axial separation, the drive sleeve 34a is longitudinally slotted at 213 and receives a cross pin 214 therein which projects from the drive stem 33a. It will be seen that the spindle 22a, collet 32a, sleeve 34a and drive stem 33a all rotate in unison; but at the same time the drive stem can move lengthwise as made possible by the longitudinal separation or convergence of the telescopic tubes 39a and 42a, which movement is effected by the rotation of the threaded guide inserts 50, 55. Such axial separation and convergence is governed by the rotation of worm gear 206, which at any desired point can be reversed or held stationary at will. Meanwhile the cutter (72) continues to be driven from the milling machine by the revolving drive stem 33a and the subsequent gear train.

The distal end of the drive stem 33a traverses a pair of bearing assemblies 215, 216, which are at opposite ends of an aperture 226 of the housing wall 57b, the drive stem carrying lock collar 267 with set screw and terminating in a bevel gear 217 in cavity 89a, engaging another bevel gear 218, at right angles thereto. The latter is formed integral with an internally ribbed sleeve 222 which embraces a splined shaft 219. The rotatable sleeve 222 is positioned by a lock nut 225 and thrust bearing mounted on its threaded end 227, the sleeve and gear 218 being thus journaled by the bearing assemblies 223, 224 which are located in a downward projection 268 from the housing wall 57b. It will thus be seen that the shaft 219 is movable lengthwise (between the positions of FIG. 25 and FIG. 31) at the same time that it is being rotated by the sleeve 222, as the latter is driven by the bevel gear 217.

The transverse chamber 89a of the gear housing 46a is open at one side (to the right in FIGS. 25, 27, 31) and is partially closed at the end or bottom by the plate 228 which is secured by screws 229, 230. Within the chamber is a longitudinally slidable frame F, formed of parallel side walls 231, 232 upstanding from a base 233 which is characterized by a projecting guide rib 234, 235 extending wedge-shaped along each side in a corresponding track or guideway of the housing 46a. Each upstanding side wall 231, 232 is formed with a closed-end slot 236, 237 through which a limit pin 238 is jointly inserted, with its head 239 lodged in an external recess 240 of the housing, and its distal, threaded end received in a tapped aperture 241 (FIG. 30). The possible distance of travel of the frame F is thus equal to the length of the pair of slots 236, 237. Lengthwise positioning or adjustment of the frame F along the chamber 89a is effected by a screw 242 which traverses the housing wall and is received in a threaded bore 243 of the base 233, being held against longitudinal displacement by a lock ring 244 (FIG. 25) within the housing. Accordingly, rotation of the screw 242 by a suitable tool applied to the external (slotted or socketed) head 245 serves to move the frame F toward or away from the head of the screw.

At the inner end of the sliding base 233 is a perpendicular end wall 246 which connects the parallel side walls 231, 232 of the frame F and extends thereabove within a cavity 247 (FIG. 31) of the housing. The end wall 246 is centrally traversed at 221 by the splined shaft 219, with a bearing ring 248 on its inner face sandwiched by a pinned collar 220 of the shaft 219. Outward or distally, the shaft 219 powers an adjustable head H and terminates in a bevel gear 249 therein.

The construction of the head H is based on a mounting plate 250 which is juxtaposed against and is rotationally adjustable relative to the outer face of the end wall 246 of the frame F. The plate 250 is traversed by the distal end of the splined shaft 219 and has a bearing assembly 251 for the shaft, inset in the plate. Lateral strips along two opposing edges of the plate are formed each with an arcuate slot 252, 253 which overlie a circle of (twelve) threaded sockets X (FIGS. 28–29), of which any diametric pair of said sockets receive a pair of bolts 254, 255 which are inserted successively through lock washers 256, 257 (FIG. 32) and through the slots of the plate. Accordingly, by deliberate selection of a particular pair of sockets X and further positioning of the arcuate slots 252, 253 relative thereto, the plate 250 (and head H) can be secured by the bolts 254, 255 at any desired location through 360° rotation, thus slanting the spindle 67a (and its cutter 72) at any selected angle.

The head construction H is completed by rectangular-forming walls 258, 259, 260, of which two are apertured and carry bearing assemblies 261, 262, and the other one is tapped and closed with a threaded plug 263. A stub shaft 264 extends through the pair of bearing assemblies and carries a bevel gear 265 which is driven by the bevel gear 249 of the longitudinally-extensible shaft 219. A cap screw 266 is threadedly received in one end of the stub shaft 264, and the opposite end of the shaft is formed by the spindle 67a having an axial bore 68a and a set screw 73a by which to mount a drive shaft and cutter as shown in FIG. 1.

DESCRIPTION OF ALTERNATE CONSTRUCTION

The construction of FIGS. 33—51 has a fixed member or inner telescopic cylinder 39b which from an annularly flared, attachment plate 270 dependently disposes a circle of terminally flanged, suspension bolts 272, each having their upper extremity 273 threaded and anchored by a nut 274 located in a socket recess 275 of the plate. An encircling retainer band 276 is apertured at 277 for sliding insertion of the respective suspension bolts 272 and in an inner annular recess 278 positions a ring gear 279 which is outwardly secured to the outer telescopic cylinder 42b. At one side the ring gear is engaged by a worm gear 280 (FIG. 34) which is lodged in a laterally projecting housing 281 and carried by an operating shaft 282 which can be manipulated in either direction by a handle 283 so as to rotate the outer telescopic cylinder 42b. As in the previous construction, the inner face of the retainer band is separated from the outer cylinder 42b by a thrust bearing B, the lower end of which rests on a protruding annular ledge 285 of the cylinder. The whole assembly may be fastened onto the end plate of a milling machine by bolts inserted through the circle of openings 284 of the attachment plate 270. The outer telescopic cylinder 42b may carry an internal bearing sleeve 286 which is in sliding contact with the inner cylinder 39b.

Internally or axially, the telescopic cylinders are coupled together by a threadedly engaged pair of guide cylinders or inserts 50a, 55a, the pitch of which determines the spiral movement which the outer cylinder 42b follows relative to the inner cylinder 39b in response to actuation of the ring gear 279 by the worm gear 280. As in the earlier forms, the mating pair of guide cylinders may be removed and replaced by a similar pair having threads of another pitch, by withdrawal of the circle of screws 288 (for the fixed guide cylinder 50a) and 289 (for the movable guide cylinder 55a) — FIGS. 33–34.

The axially movable drive stem 33b (fastened to the spindle of a milling machine as in FIG. 1) distally is journalled in two axially spaced, ball bearing assemblies 287, 290 (FIG. 33, 43) between which it carries a gear 291. The latter is the initial or drive unit of a split-intermediate trio or gear train (291, 292a, 292b, 293) which is arranged for the earlier noted scissors action while maintaining continuous transmission of the rotary drive to the ultimate driven gear 293 of the trio; in the present instance, shift of the third gear being effected in a straight line by calibrated movement of the undercarriage C.

The laterally projecting body of the rotatable housing member 46b is fastened to the bottom of the rotatable tube 42b by a circle of screws 314 (FIGS. 43, 44) and dependently carries a transversely adjustable undercarriage C of generally rectangular shape. The two upper, longitudinal edges of the carriage C are each formed with a convergingly directed or angularly inslanted, attachment shoulder 294, 296 (FIG. 37) which are retained longitudinally slidable in corresponding slideways of channels 295, 297 of the opposite sides of the gear housing 46b and fastened by set screws 301 (FIG. 43). In assembly, a tapered wedge 300 which serves as a bearing surface is inserted along one slideway 297 and secured to the shoulder 296 by a washer-retaining screw 298, 299 at each end (FIG. 39).

A shallow longitudinal slide channel 304 is formed in the underface of the housing 46b and receives a flat slide plate P having an open oval center 333. The plate serves as a grease seal for the chamber above it. A bottom-opening, longitudinal slot 302 in the top of the slide channel, receives a stop pin 303 (FIG. 40, 43) upstanding from the slide plate P, so as to provide limits of travel of the slide in each direction with movement of the undercarriage. The upper face of the carriage C is also formed with another open-top rectangular channel 305 (FIGS. 43, 44) which houses a longitudinally tapped block or nut 306 having an upward-projecting portion received in a socket 308 of the housing 42b and anchored by a screw 309. A longitudinal positioning screw 310 is threadedly received through the nut 305 with its socketed head 311 disposed at an end-face 312 (FIG. 37) of the carriage and there restrained against longitudinal movement. Accordingly, the positioning screw 310 can be rotated in either direction by a wrench (not shown) inserted into its end socket 313, thereby sliding the undercarriage C in one direction or the other along the underface of the gear housing 42b. Calibration indicia around the end face 311 of the positioning screw provide a gage of the linear movement of the carriage and enable its subsequent return to any previous setting.

The two intermediate gear portions 292a and 292b are fixedly connected to the movable shaft E, the upper cap 316 of the latter being slidable along an arcuate guide slot H1 (FIG. 45) in extension and retraction of the gear train. A mounting nut 317 is on the bottom threaded end of the shaft E. The two portions of the diametrically split, intermediate gear are on opposite sides of a rotatable plate 368 which is retained in the annular housing 42b by a snap ring 369. The plate is axially apertured at 367 for insertion of the respective shaft end screws 365, 366 (FIG. 47) but no shaft traverses the aperture. However, the plate is traversed offcenter by the shaft E, and a link plate 370 is juxtaposed against its underface. The link plate is restrictedly rotatable jointly about a dependent boss 371 of the rotatable plate 368 and about the bearing assembly 321. A post 372 (FIG. 48) projects downward from the link 370 (FIG. 48) along one side edge thereof, with a dependent pin 332 which passes lengthwise through the guide channel 324 of a housing-floor boss 315 upon movement of the gears and link 370. This transitory anchorage gives a pivot point for the rotatable plate 368.

The driven shaft 320 and its bearing assemblies 322, 323 are retained in a tubular housing insert 346 as a composite unit. This is displaceable between the alternate housing recesses 347, 348 (FIG. 46) upon longitudinal movement of the undercarriage C, which by concurrent limited rotation of the plate 368 in conjunction with the link 370 produces the scissors action of the gear train.

The bevel gear 326 carried by the shaft 320 engages another bevel gear 327 of a transverse shaft 328 which also carries another gear 329 between bearing assemblies 330, 331. In a longitudinal chamber 334 of the carriage, formed at one side of and generally parallel to the shaft 328, is a longer shaft 335 journalled in axially spaced bearing assemblies 336, 337 and on one end carrying a spur gear 338 in mesh with the gear 329. Distally it carries a bevel gear 339 which engages a bevel gear 340 of a transverse inward-directed shaft 341. The latter is journalled in three bearing assemblies 342, 343, 344 and terminally carries a bevel gear 345 (FIG. 41) which acts as a drive gear for the positioning head H2 as described below.

The end of the carriage C which projects the greater amount laterally from the lower telescopic cylinder 42b (left in FIGS. 33, 48) is formed with a central generally rectangular or cubical recess 350, defined by three upright walls 351, 352, 353, overhung by the rotatable member or housing 46b and partially by the plate P, with the outer end and bottom of the recess open. The recess forms a socket or pivot mount for a positioning head H2 which carries the ultimate, rotary (thread) cutter (72). The upright side wall 353 is formed with an annular groove or raceway 354 (FIG. 41) surrounding the bearing assembly 344, shaft 341 and bevel gear 345 which axially project therethrough from within the carriage. An annular shoulder 355 of the head H2 is rotatably seated in the groove 354 with the carriage bevel gear 345 extending through an axial opening 356 of the head to engage a bevel gear 357 (FIG. 41) carried by a spindle 358 within the body of the head H2. The opposite side 359 of the head H2 carries an annular boss which is socketed in the recess wall 351. A circle of tapped bores 360 in the side of the head, receive anchoring screws 361 inserted through the outward-opening bores 362 of the carriage. A cylindrical bore 363 in the side of the carriage axial to the head H2 gives access for a wrench to engage the hexagonal socket 364 and thus to relocate the head angularly (i.e., tilt) when the anchoring screws 361 are absent.

Figure 51:
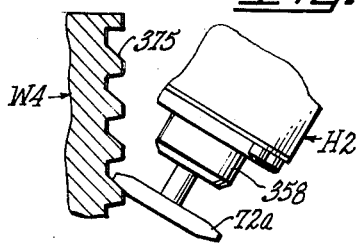
FIG. 51 is a schematic view of the position taken by the cutter of FIGS. 35–50 in cutting buttress threads.

With the tiltable head H2, any milling cutter such as the buttress-thread cutter 72a of FIG. 51 can be positioned within the open-top bore of a stationary workpiece, and by spiral movement of the rotatable housing member 42b in either direction, it cuts a buttress thread. It had not been possible to do this previously. While the tiltable head construction has been described with particular reference to this advanced usage, it will be apparent of course that a milling cutter carried by such a head can also perform ordinary milling tasks. Further advantage is obtained by reason of the transverse adjustability of the undercarriage. Also, when the head is thus tilted, a cutter of lesser diameter can be employed and thus reduce the cutting force required as compared with a cutter of greater diameter.

I claim:

1. In combination with rotary drive means extending from a stationary housing to a rotatable housing and functionally projecting a rotary cutter from the rotatable housing, said housings being connected by extension means adapted to move the rotatable housing in a curved path relative to the stationary housing whereby the rotary cutter may cut curved threads on a workpiece, the improvement comprising a tiltable positioning head carried by the rotatable housing and characterized by a spindle adapted distally to project said rotary cutter, said positioning head also having lock means for anchoring the same at selected tilt positions relative to the rotatable housing, and extension gear means connecting the spindle of the positioning head with the rotary drive means of the rotatable housing, whereby the positioning head can be selectively located at different positions transverse to the axis of said rotary drive shaft and tilted from such positions.

2. The combination of the preceding claim 1 wherein said extension gear means comprise a splined shaft transversely carried by the rotatable housing and axially disposed in a longitudinally ribbed bore of a bevel gear which is engaged by said rotary drive means, the distal end of said shaft drivingly engaging the spindle of the tiltable positioning head.

3. The combination of the preceding claim 1 wherein said extension means include interchangeable pairs of threadedly engaged guide cylinders, whereby the pitch of an engaged pair of guide cylinders may be duplicated by the threads being cut by the rotary cutter.

4. The combination of the preceding claim 1 wherein said rotatable housing carries ring gear means and a support axially extensible from the stationary housing carries worm gear means which engages said ring gear means, whereby manipulation of the worm gear means moves the rotatable housing spirally.

5. A milling assembly of the character described, comprising in combination:

a stationary member and a rotatable member axially spaced apart by telescopic means connecting the two members for individual or joint, rotational and axial movement of the rotatable member, including means for mounting interchangeable pairs of mutually rotatably engaging, cylindrical guide sleeve means respectively supported by the stationary member and the rotatable member, and thus adapted by their relative rotation to determine the movement of the rotatable member relative to the stationary member and when threadedly engaged to cause a rotary cutter carried by the rotatable member to reproduce the pitch of such threads on a workpiece;

a tiltable positioning head carried by the rotatable member and characterized by a spindle adapted distally to project said rotary cutter, said positioning head also having lock means for anchoring the same at selected tilt positions relative to the rotatable member, and lateral extension means connecting the spindle of the positioning head with the rotatable member, whereby the positioning head can be selectively located at different positions transverse to the axis of said rotatable member and tilted from such positions.

6. An assembly according to claim 5 wherein the axis of said rotary cutter is positionable substantially opposite to the direction of extension of said telescopic means.

7. An assembly according to claim 5 wherein the axis of said rotary cutter is positionable to conform to the inclination of the thread being cut.

8. As assembly according to claim 5 wherein the axis of said rotary cutter is positionable substantially throughout a rotational adjustment of 360°.

* * * * *